United States Patent [19]
Kim et al.

[11] Patent Number: 6,117,501
[45] Date of Patent: Sep. 12, 2000

[54] NEMATIC LIQUID CRYSTAL COMPOSITION AND LIQUID CRYSTAL DISPLAY USING THE SAME

[75] Inventors: Sung-han Kim, Seoul; You-jin Lee, Kyungki-do; Moo-jong Lim; Dong-jin Jeong, both of Seoul; Kee-han Uh, Yongin; Vladimir S. Bezborodov; Valery I. Lapanik, both of Pyungtaek, all of Rep. of Korea

[73] Assignee: Samsung Display Devices Co., Ltd., Kyungki-Do, Rep. of Korea

[21] Appl. No.: 09/318,864

[22] Filed: May 26, 1999

[30] Foreign Application Priority Data

May 26, 1998 [KR] Rep. of Korea ............ 98-19038

[51] Int. Cl.$^7$ .................... C09K 19/34; C09K 19/20; C09K 19/52
[52] U.S. Cl. ............ 428/1.1; 252/299.01; 252/299.61; 252/299.67
[58] Field of Search ............ 252/299.61, 299.67, 252/299.01; 428/1.1

[56] References Cited

U.S. PATENT DOCUMENTS 3,925,482 12/1975 Jacques ..................... 568/631
4,528,116 7/1985 Dabrowski et al. ............ 252/299.63
4,853,150 8/1989 Bezborodov et al. ............ 252/299.61

FOREIGN PATENT DOCUMENTS 2-267521 11/1990 Japan.
2-269313 11/1990 Japan.

OTHER PUBLICATIONS

CAPLUS 1997:20732.
CAPLUS 1992: 49046.

*Primary Examiner*—Shean C. Wu
*Attorney, Agent, or Firm*—Leydig, Voit & Mayer

[57] ABSTRACT

A liquid crystal composition obtained by mixing a phenylalkyl dioxaborinane derivative, an isothiocyanate derivative, a tolan derivative and a pyrimidine-phenyl derivative in an appropriate ratio, and a liquid crystal display using the same are provided. The liquid crystal composition reveals a nematic phase at a wide range of a temperature including room temperature and having optical anisotropies and dielectric anisotropies of various magnitudes. Also, a twisted nematic (TN) type liquid crystal display manufactured using the liquid crystal composition can be driven in a multiplexed manner.

6 Claims, No Drawings

NEMATIC LIQUID CRYSTAL COMPOSITION AND LIQUID CRYSTAL DISPLAY USING THE SAME

BACKGROUND OF THE INVENTION

1. Field of the Invention

The present invention relates to a liquid crystal composition and a liquid crystal display using the same, and more particularly, to a liquid crystal composition which reveals a nematic phase over a wide range of temperatures including room temperature, and which has optical anisotropies and dielectric anisotropies of various magnitudes, and a liquid crystal display using the liquid crystal composition which can be driven in a multiplexed manner.

2. Description of the Related Art

A phenyl alkyl dioxaborinane derivative represented by the following formula is a polar liquid crystalline compound having a high dielectric anisotropy $\Delta\in$. The method for synthesizing the dioxaborinane derivative represented by the following formula is described in detail in U.S. Pat. No. 4,853,150 allowed to Bezborodov et al. and now assigned to the applicant of the present invention.

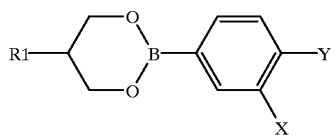

where R1 represents an alkyl group having 1 to 12 carbon atoms, Y represents a cyano group, a halogen group, OR,

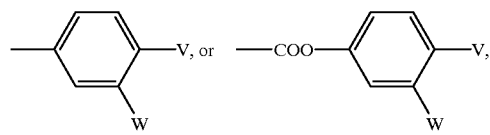

X, V and W represent simultaneously or independently hydrogen, a halogen, a cyano group, an alkyl group having 1 to 12 carbon atoms, or an alkoxy group having 1 to 12 carbon atoms, and R represents an alkyl group having 1 to 12 carbon atoms.

An isothiocyanate derivative represented by the following formula is a polar liquid crystalline compound having a low viscosity and a high dielectric anisotropy. The characteristics thereof are described in detail in PL 241,286 and U.S. Pat. No. 4,528,116.

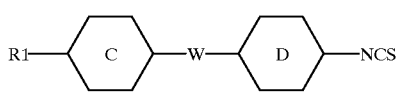

where R1 represents an alkyl group having 1 to 12 carbon atoms, C and D represent simultaneously or independently a phenyl group, a biphenyl group, a cyclohexyl group or a cyclohexylphenyl group, and W represents a single bond (i.e., directly connected) or an ethylene group (—CH₂CH₂—).

A compound represented by the following formula is a non-polar liquid crystalline compound having a low viscosity. The characteristics thereof are described in detail in DE-OS 2,638,634 and DDR 171,971.

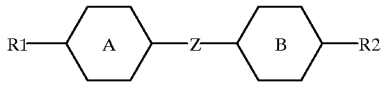

where R1 and R2 represent simultaneously or independently an alkyl group having 1 to 12 carbon atoms or an alkoxy group having 1 to 12 carbon atoms, A and B represent simultaneously or independently a phenyl group, a biphenyl group, a cyclohexyl group or a biphenyl group having a methyl group, and Z represents a single bond (i.e., directly connected) or an ester bond (—COO—).

A tolan derivative represented by the following formula is a non-polar liquid crystalline compound having a high optical anisotropy $\Delta n$. The characteristics thereof are described in detail in U.S. Pat. No. 3,529,482.

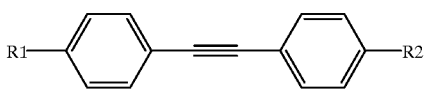

where R1 and R2 simultaneously or independently represent an alkyl group having 1 to 12 carbon atoms or an alkoxy group having 1 to 12 carbon atoms.

A pyrimidine-phenyl derivative represented by the following formula is a liquid crystal having a low elastic constant. A method for synthesizing the same is described in detail in Mol.Cryst. Liq.Cryst., 68, 57 (1981) and DDR 95892.

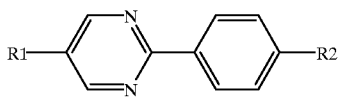

where R1 and R2 simultaneously or independently represent an alkyl group having 1 to 12 carbon atoms, an alkoxy group having 1 to 12 carbon atoms or a cyano (—CN—) group.

SUMMARY OF THE INVENTION

It is an objective of the present invention to provide a liquid crystal composition which reveals a nematic phase over a wide range of temperature, including room temperature, and which has optical anisotropies and dielectric anisotropies of various magnitudes.

It is another objective of the present invention to provide a twisted nematic (TN) liquid crystal display using the liquid crystal composition, which can be driven in a multiplexed manner.

Accordingly, to achieve the first objective, there is provided a nematic liquid crystal composition comprising:

a compound represented by a formula (1);

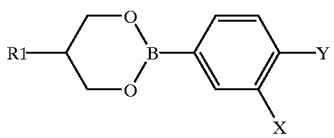
(1)

where R1 represents an alkyl group having 1 to 12 carbon atoms, and Y represents a cyano group, a halogen, OR,

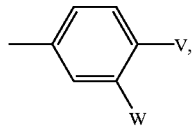

or in which X, V and W represent simultaneously or independently hydrogen, a halogen, a cyano group, an alkyl group having 1 to 12 carbon atoms, an alkoxy group having 1 to 12 carbon atoms, or an unsubstituted or substituted aryl group, and R represents an alkyl group having 1 to 12 carbon atoms, a compound represented by a formula (2);

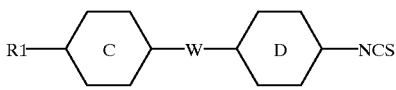
(2)

where R1 represents an alkyl group having 1 to 12 carbon atoms, C and D represent simultaneously or independently a phenyl group, a biphenyl group, a cyclohexyl group or a cyclohexylphenyl group, and W represents a single bond or an ethylene group ($-CH_2CH_2-$), at least one selected from the group consisting of a compound represented by a formula (3) and a compound represented by a formula (4):

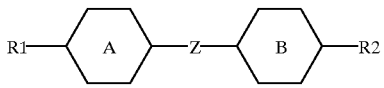
(3)

where R1 and R2 represent simultaneously or independently an alkyl group having 1 to 12 carbon atoms or an alkoxy group having 1 to 12 carbon atoms, A and B represent simultaneously or independently a phenyl group, a biphenyl group, a cyclohexyl group or a biphenyl group having a methyl group, and Z represents a single bond or an ester group($-COO-$),

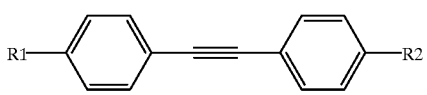
(4)

where R1 and R2 represent simultaneously or independently an alkyl group having 1 to 12 carbon atoms or an alkoxy group having 1 to 12 carbon atoms.

The liquid crystal composition according to the present invention may further include a compound represented by a formula (5):

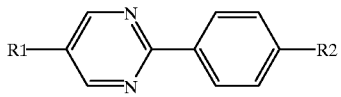
(5)

where R1 and R2 represent simultaneously or independently an alkyl group having 1 to 12 carbon atoms, an alkoxy group having 1 to 12 carbon atoms, or a cyano group.

The content of the compound represented by the formula (5) is 1.0~20.0 parts by weight. If the content of the compound represented by the formula (5) exceeds 20.0 parts by weight, the viscosity of the liquid crystal composition becomes too high.

To achieve the second objective, there is provided a liquid crystal display which is manufactured by inserting the nematic liquid crystal composition according to the present invention into a pair of electrode.

DESCRIPTION OF THE PREFERRED EMBODIMENTS

The liquid crystal composition according to the present invention includes as essential components a compound represented by a formula (1), a compound represented by a formula (2) and at least one selected form the group consisting of a compound represented by a formula (3) and a compound represented by a formula (4).

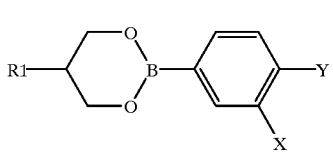
(1)

where R1 represents an alkyl group having 1 to 12 carbon atoms, and Y represents a cyano group, a halogen, OR,

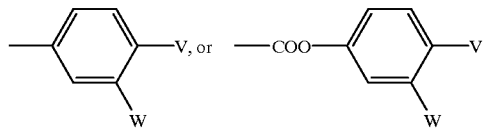

in which X, V and W represent simultaneously or independently hydrogen, a halogen, a cyano group, an alkyl group having 1 to 12 carbon atoms, an alkoxy group having 1 to 12 carbon atoms, or an unsubstituted or substituted aryl group, and R represents an alkyl group having 1 to 12 carbon atoms,

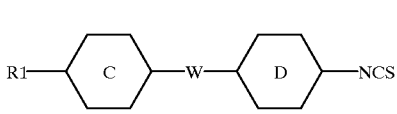
(2)

where R1 represents an alkyl group having 1 to 12 carbon atoms, C and D represent simultaneously or independently a phenyl group, a biphenyl group, a cyclohexyl group or a cyclohexylphenyl group, and W represents a single bond or an ethylene group(—CH$_2$ CH$_2$—),

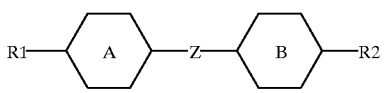

(3)

where R1 and R2 represent simultaneously or independently an alkyl group having 1 to 12 carbon atoms or an alkoxy group having 1 to 12 carbon atoms, A and B represent simultaneously or independently a phenyl group, a biphenyl group, a cyclohexyl group or a biphenyl group having a methyl group, and Z represents a single bond or an ester group(—COO—),

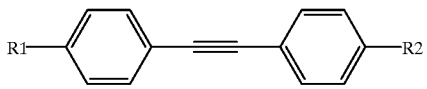

(4)

where R1 and R2 represent simultaneously or independently an alkyl group having 1 to 12 carbon atoms or an alkoxy group having 1 to 12 carbon atoms.

Also, the liquid crystal composition according to the present invention may further include a compound represented by a formula (5):

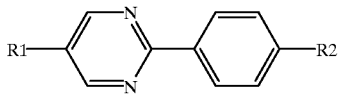

where R1 and R2 represent simultaneously or independently an alkyl group having 1 to 12 carbon atoms, an alkoxy group having 1 to 12 carbon atoms, or a cyano group. Here, the contents of the respective compounds may slightly differ depending on characteristics of a device to be manufactured. However, preferably, the contents of the compounds represented by the formulas (1), (2), (3) and (4) are 1.0~65.0 parts by weight, 1.0~65.0 parts by weight, 1.0~50.0 parts by weight, and 1.0~20.0 parts by weight, respectively. If the contents of the compounds represented by the formulas (1) and (2) exceed 65.0 parts by weight, respectively, the viscosity of the liquid crystal composition becomes too high. If the content of the compound represented by the formula (3) exceeds 50.0 parts by weight, the nonpolarity of the liquid crystal composition increases so that the threshold voltage V$_{th}$ of the liquid crystal composition becomes too high. If the content of the compound represented by the formula (4) exceeds 20.0 parts by weight, the nonpolarity of the liquid crystal composition increases so that the threshold voltage V$_{th}$ of the liquid crystal composition becomes too high and the optical anisotropy Δn becomes too high.

The present invention will be described in more detail through the following examples, but without limiting the scope of the invention.

EXAMPLE 1

As shown in Table 1, a liquid crystal composition was prepared by mixing 24.7 wt % of a compound represented by a formula 3b, 12.3 wt % of a compound represented by a formula 3c, 14.3 wt % of a compound represented by a formula 1b, 9.4 wt % of a compound represented by a formula 1c, 6.7 wt % of a compound represented by a formula 1d, 4.8 wt % of a compound represented by a formula 2b, 11.4 wt % of a compound represented by a formula 2d, 2.8 wt % of a compound represented by a formula 2f and 13.6 wt % of a compound represented by a formula 4a. The liquid crystal composition was heated to a temperature higher than that at which it revealed an isotropic phase, stirred, and then cooled to room temperature, thereby obtaining a uniformly mixed liquid crystal composition.

The thus-obtained liquid crystal composition was injected into a 90° twisted nematic cell of 6 μm thickness and then its electrooptical properties were measured at room temperature. Table 2 summarizes the measured electrooptical properties. Referring to Table 2, the nematic phase formation temperature of the liquid crystal composition, T$_{N-1}$, was 75 ° C. Thus, it was understood that the liquid crystal composition according to this embodiment revealed a nematic phase up to 75° C., which includes room temperature. The optical anisotropy Δn was 0.1406, the dielectric anisotropy Δ∈ was 9.9, the threshold voltage V$_{10}$ (the voltage at which the cell passes 10% of the light falling on it) was 1.48 V, the saturation voltage V$_{90}$ (the voltage at which the cell passes 90% of the light falling on it) was 2.11 V, and the number of duties N$_{90}$ defined as below was 8.62.

$$N_{90} = \left( \frac{\left(\frac{V_{90}}{V_{10}}\right)^2 + 1}{\left(\frac{V_{90}}{V_{10}}\right)^2 - 1} \right)^2$$

EXAMPLES 2 THROUGH 45

The liquid crystal composition was manufactured in the same manner as in Example 1, except that the components of the liquid crystal composition were changed as listed in Table 1.

The thus-obtained liquid crystal compositions were injected into a 90° twisted nematic cells of 6 μm thickness and then their electrooptical properties were measured at room temperature. Table 2 summarizes the measured electrooptical properties. Referring to Table 2, the nematic phase formation temperature of the liquid crystal compositions, T$_{N-1}$, was 63.3~110.7° C. That is, it was understood that the liquid crystal compositions according to these embodiments revealed a nematic phase over a wide range of temperatures, including room temperature. Also, referring to Tables 1 and 2, it is understood that the optical anisotropy and the dielectric anisotropy of the liquid crystal compositions of the present invention were adjustable by controlling the ratios of the components. Also, since the number of duties N$_{90}$ of the liquid crystal compositions of the present invention is in the range of 6.51 to 8.95, a liquid crystal display which can be driven in a multiplexed manner can be manufactured using the liquid crystal compositions of the present invention. The alkyl group and the alkyl group in the alkoxy group listed in Table 1 are both of normal structure.

TABLE 1

| Component | Structure | Example | | | | | | | | |
|---|---|---|---|---|---|---|---|---|---|---|
| | | 1 | 2 | 3 | 4 | 5 | 6 | 7 | 8 | 9 |
| (3a) | H₃C–[cyclohexyl]–[phenyl]–OCH₃ | | 4.5 | 4.2 | 4.6 | 4.3 | 3.5 | | 2.5 | |
| (3b) | H₃C–[butyl]–[cyclohexyl]–COO–[phenyl]–[pentyl]–CH₃ | 24.7 | 8.1 | 7.5 | 8.3 | 7.7 | 6.3 | 23 | 4.5 | 18 |
| (3c) | H₃C–[butyl]–[cyclohexyl]–COO–[phenyl]–OCH₃ | 12.3 | 19.3 | 17.9 | 19.8 | 18.5 | 15.1 | 12 | 10.7 | 7 |
| (3d) | H₃C–[butyl]–[cyclohexyl]–COO–[phenyl]–O–[butyl]–CH₃ | | 13.1 | 12.1 | 13.3 | 12.5 | 10.1 | | 7.3 | |
| (1a) | H₃C–[pentyl]–[dioxaborinane]–[phenyl-F,F] | | | 3 | | 3 | | | | |
| (1b) | H₃C–[pentyl]–[dioxaborinane]–[phenyl-F]–COO–[phenyl-F]–CN | 14.3 | 16.5 | 16.5 | 17 | 17 | 10 | 10 | 10 | 10 |
| (1c) | H₃C–[pentyl]–[dioxaborinane]–[phenyl-F]–COO–[phenyl-CH₃]–[pentyl]–CH₃ | 9.4 | | | | | 10 | 10 | 10 | 10 |

TABLE 1-continued

| | Structure | | | | | | | | |
|---|---|---|---|---|---|---|---|---|---|
| (1d) | [structure with dioxaborinane-phenyl(F)-COO-phenyl-phenyl(CH₃)-pentyl] | 6.7 | | 10 | 10 | 10 | 10 | | |
| (1e) | [structure with dioxaborinane-phenyl(F)-phenyl(CN)] | | | | 10 | 10 | 10 | | |
| (2a) | [propyl-cyclohexyl-phenyl-NCS] | 4.8 | | | | | | | |
| (2b) | [butyl-cyclohexyl-phenyl-NCS] | | | | | | | | | |
| (2c) | [pentyl-cyclohexyl-phenyl-NCS] | 11.4 | 9.4 | 15 | 15 | 15 | | | |
| (2d) | [hexyl-cyclohexyl-phenyl-NCS] | | 20 | 20 | 15 | 15 | | | |
| (2e) | [heptyl-cyclohexyl-phenyl-NCS] | 2.8 | | | 15 | 15 | | | |
| (2f) | [octyl-cyclohexyl-phenyl-NCS] | | | | | | | | |

TABLE 1-continued

| Component | Structure | 10 | 11 | 12 | 13 | 14 | 15 | 16 | 17 | 18 |
|---|---|---|---|---|---|---|---|---|---|---|
| (2g) | H₃C—cyclohexyl—phenyl—CH₂CH₂—cyclohexyl—phenyl—NCS | 6.8 | 7 | 7 | 7 | 7 | | | 10 | 10 |
| (5a) | H₃C—(CH₂)₃—pyrimidine—phenyl—CN | 13.6 | 12.6 | 12.6 | | | | | | |
| (4a) | H₃C—(CH₂)₂—phenyl—C≡C—phenyl—OCH₃ | | | | 10 | 10 | 10 | 10 | 10 | 10 |
| (4b) | H₃C—(CH₂)₂—phenyl—C≡C—phenyl—OCH₂CH₃ | | | | 10 | 10 | 10 | 10 | 10 | 10 |
| (3a) | H₃C—cyclohexyl—phenyl—OCH₂CH₃ (with pentyl) | | | 2.5 | | | | | 3.5 | 3.5 |
| (3b) | H₃C—(CH₂)₃—cyclohexyl—COO—phenyl—OCH₂CH₃ | | | 4.5 | 18 | | 23 | 23 | 6.3 | 6.3 |
| (3c) | H₃C—(CH₂)₂—cyclohexyl—COO—phenyl—OCH₂CH₃ | | | 10.7 | 7 | | 12 | 12 | 15.1 | 15.1 |
| (3d) | H₃C—(CH₂)₂—cyclohexyl—COO—phenyl—O(CH₂)₃CH₃ | | | 7.3 | | | | | 10.1 | 10.1 |

TABLE 1-continued

| | | | | | | | | |
|---|---|---|---|---|---|---|---|---|
| (1a) | ![structure] | | 15.4 | 13.3 | 15 | 20 | 10 | 10 |
| (1b) | ![structure] | | 15.4 | 13.3 | 15 | 15 | 10 | 10 | 10 |
| (1c) | ![structure] | | 15.4 | 13.3 | 10 | 10 | 10 | 5 | 5 |
| (1d) | ![structure] | | 15.4 | 13.3 | 10 | 10 | 13.3 | 10 | 10 | 10 |
| (1e) | ![structure] | | | 15.4 | 13.3 | | | | |
| (2a) | ![structure] | | 5 | 4 | 8 | 8 | 10.7 | 5 | 5 | 5 |
| (2b) | ![structure] | | | | | | | 5 | 5 | 5 |

TABLE 1-continued

| Component | Structure | 19 | 20 | 21 | 22 | 23 | 24 | 25 | 26 | 27 |
|---|---|---|---|---|---|---|---|---|---|---|
| (2c) | H₃C—cyclohexyl—C₆H₄—NCS | 15 | 13 | 17 | 17 | 25.7 | 15 | 15 | 15 | |
| (2d) | H₃C—cyclohexyl—C₆H₄—NCS | | 3 | 5 | 5 | 6.7 | 5 | 5 | 5 | |
| (2e) | H₃C—cyclohexyl—C₆H₄—NCS | | | 10 | 10 | 13.3 | 5 | 5 | 5 | |
| (2f) | H₃C—cyclohexyl—C₆H₄—NCS | 3 | 3 | | | | | | | |
| (2g) | H₃C—cyclohexyl—C₆H₄—cyclohexyl—C₆H₄—NCS | | 13.3 | | | | | | | |
| (5a) | H₃C—pyrimidine—C₆H₄—CN | | | | | | | | | |
| (4a) | H₃C—C₆H₄—C≡C—C₆H₄—OCH₃ | 15.4 | | | | | 10 | 10 | 10 | 10 |
| (4b) | H₃C—C₆H₄—C≡C—C₆H₄—OCH₂CH₃ | | 13.5 | | | | | | | |

TABLE 1-continued

| | Structure | | | | | | | |
|---|---|---|---|---|---|---|---|---|
| (3a) | 4-ethoxyphenyl-4-propylcyclohexane | 22 | 22 | | 3.3 | 3.4 | | | |
| (3b) | pentylphenyl 4-pentylcyclohexanecarboxylate | 10 | 10 | 23 | 6.0 | 6.1 | 10 | 23 | 22 |
| (3c) | 4-ethoxyphenyl 4-pentylcyclohexanecarboxylate | | | 12 | 14.3 | 14.6 | 5 | 12 | 10 |
| (3d) | 4-butoxyphenyl 4-pentylcyclohexanecarboxylate | | | | 9.7 | 9.9 | | | |
| (1a) | 2-(3,4-difluorophenyl)-5-pentyl-1,3,2-dioxaborinane | 3 | 3 | | | 4.3 | | | 3 |
| (1b) | dioxaborinane cyanofluoro ester | 10 | 10 | 10 | 15 | 13 | 13 | 10 | 10 |
| (1c) | dioxaborinane methyl fluoro ester | 10 | 5 | 5 | 5 | 5 | 7 | 5 | 5 |
| (1d) | dioxaborinane biphenyl fluoro ester | 10 | 10 | 10 | 9.5 | 9.5 | 10 | 10 | 10 |

TABLE 1-continued
| | Structure | | | | | | | | |
|---|---|---|---|---|---|---|---|---|---|
| (1e) |  | | | | | | | | |
| (2a) |  | 5 | 5 | 5 | 4 | 3 | 12 | 12.7 | 7.9 | 7.9 |
| (2b) |  | | | | | | 5.2 | 5.2 | 3.2 | 3.2 |
| (2c) |  | | | | | | 2.0 | 2.0 | 1.3 | 1.3 |
| (2d) |  | 15 | 15 | 15 | 14.7 | 14 | 13.3 | 13.3 | 8.3 | 8.3 |
| (2e) |  | | | | | | 3.2 | 3.2 | 2.0 | 2.0 |
| (2f) |  | 5 | 5 | 5 | 4 | 3 | 3.6 | 3.6 | 2.3 | 2.3 |
| (2g) | 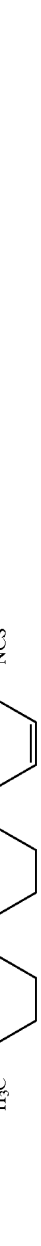 | 5 | 5 | 5 | 5 | 5 | 5 | 5 | 5 | 5 |

TABLE 1-continued

| Component | Structure | 28 | 29 | 30 | 31 | 32 | 33 | 34 | 35 | 36 |
|---|---|---|---|---|---|---|---|---|---|---|
| (5a) | H₃C—⬡—pyrimidine—⬡—CN | | | | | | | | | |
| (4a) | H₃C—⬡—C≡C—⬡—O—CH₃ | | | | | | | | | |
| (4b) | H₃C—⬡—C≡C—⬡—O—CH₂CH₃ | | | 3 | | | | | | |
| | | | 10 | 10 | 7 | 9.5 | 9.5 | 10 | 10 | 10 |
| (3a) | H₃C—O—⬡—cyclohexyl—CH₂CH₃ | 3.5 | 3.2 | 3.0 | 4.0 | 3.5 | | 3.2 | 3.2 | 3.9 |
| (3b) | H₃C—cyclohexyl—COO—⬡—CH₃ | 6.3 | 5.8 | 5.4 | 7.2 | 6.3 | 23 | 5.8 | 5.8 | 7.0 |
| (3c) | H₃C—cyclohexyl—COO—⬡—O—CH₂CH₃ | 15.1 | 13.7 | 12.9 | 17.2 | 15.1 | 12 | 13.7 | 13.7 | 16.7 |
| (3d) | H₃C—cyclohexyl—COO—⬡—O—CH₃ | 10.1 | 9.3 | 8.7 | 11.6 | 10.1 | | 9.3 | 9.3 | 11.3 |
| (1a) | H₃C—dioxaborinane—⬡—F,F | 3 | | | | | | 3 | | |

TABLE 1-continued

| | Structure | | | | | | | | | |
|---|---|---|---|---|---|---|---|---|---|---|
| (1b) | [structure with dioxaborinane-C6H3F-COO-C6H3F-CN] | 10 | 10 | 10 | 10 | 10 | 10 | 10 | 12 | 11.1 |
| (1c) | [structure with dioxaborinane-C6H3F-OOC-C6H3(CH3)-C5H11] | 5 | 5 | 6 | 5 | 5 | 5 | 5 | 5.5 | |
| (1d) | [structure with dioxaborinane-C6H3F-OOC-C6H3-C6H3(CH3)-C5H11] | 10 | 10 | 10 | 10 | 10 | 10 | 11 | 11.1 | |
| (1e) | [structure with dioxaborinane-C6H3F-CN] | 10 | | | | | | | | |
| (2a) | [structure with cyclohexyl-C6H4-NCS] | 7.9 | 7.9 | 7.9 | 6.3 | 9.4 | 9.4 | 9.4 | 9.4 | |
| (2b) | [structure with cyclohexyl-C6H4-NCS] | 3.2 | 3.2 | 3.2 | 2.6 | | | | | 5.5 |
| (2c) | [structure with bicyclohexyl-C6H4-NCS] | 1.3 | 1.3 | 1.3 | 1.0 | | | | | |
| (2d) | [structure with bicyclohexyl-C6H4-NCS] | 8.3 | 8.3 | 8.3 | 6.7 | 11.2 | 11.2 | 11.2 | 11.2 | 16.7 |

TABLE 1-continued

| Component | Structure | 37 | 38 | 39 | 40 | 41 | 42 | 43 | 44 | 45 |
|---|---|---|---|---|---|---|---|---|---|---|
| (2e) | H₃C—(Cy)—(Cy)—(Ph)—NCS | | | | | 2.0 | 2.0 | | | |
| (2f) | H₃C—(Cy)—(Cy)—(Ph)—NCS | 2.3 | 2.3 | 2.3 | 1.8 | | | | | 5.5 |
| (2g) | H₃C—(Cy)—(Cy)—(Ph)—CH₂CH₂—(Ph)—NCS | 5 | 5 | 7 | 5 | 5 | | | | 5.7 |
| (5a) | H₃C—(pyrimidine)—(Ph)—CN | | | | | | | | | |
| (4a) | H₃C—(Ph)—C≡C—(Ph)—OCH₃ | | | | | | | | | 10 |
| (4b) | H₃C—(Ph)—C≡C—(Ph)—OC₂H₅ | 10 | 10 | 10 | 10 | 10 | 10 | 10 | 10 | |
| (3a) | H₃C—(Cy)—(Ph)—OC₂H₅ | 3.9 | 3.9 | 3.3 | 3.2 | 2.5 | 1.5 | 2.0 | 2.0 | 2.2 |
| (3b) | H₃C—(Cy)—(Cy)—COO—(Ph)—CH₃ (with pentyl) | 7.0 | 7.0 | 6.0 | 5.7 | 4.5 | 2.7 | 3.6 | 3.6 | 4.0 |

TABLE 1-continued

| | | | | | | | | |
|---|---|---|---|---|---|---|---|---|
| (3c) | (structure) | 16.7 | 16.7 | 13.5 | 10.7 | 6.5 | 8.6 | 8.6 | 9.6 |
| (3d) | (structure) | | | 14.3 | | 4.3 | 5.8 | 5.8 | 6.4 |
| (1a) | (structure) | 11.3 | 11.3 | 9.7 | 7.3 | | | | |
| (1b) | (structure) | 11.1 | 11.1 | 9.5 | 9 | 10 | 10 | 10 | 11.3 |
| (1c) | (structure) | 5.5 | 5.5 | 4.7 | 4.5 | 5 | 5 | 5 | 5.5 |
| (1d) | (structure) | 11.1 | 11.1 | 9.5 | 9 | 10 | 10 | 10 | 11.1 |
| (1e) | (structure) | | | | | | | | |

TABLE 1-continued

| | Structure | | | | | | | | |
|---|---|---|---|---|---|---|---|---|---|
| (2a) | H3C—cyclohexyl—C6H4—NCS (propyl chain) | 8.8 | 10.4 | 8.8 | 8.4 | 13.1 | 16.8 | 12.7 | 14.9 | 14.1 |
| (2b) | H3C—cyclohexyl—C6H4—NCS (butyl chain) | 3.6 | | | | | | 5.2 | | 5.7 |
| (2c) | H3C—cyclohexyl—C6H4—NCS (pentyl chain) | 1.4 | | | | | | 2.0 | | 2.2 |
| (2d) | H3C—cyclohexyl—C6H4—NCS (hexyl chain) | 9.2 | 12.8 | 10.9 | 10.4 | 16.1 | 20.7 | 13.3 | 18.4 | 14.8 |
| (2e) | H3C—cyclohexyl—C6H4—NCS (heptyl chain) | 2.3 | | | | | | 3.2 | | 3.6 |
| (2f) | H3C—cyclohexyl—C6H4—NCS (octyl chain) | 2.5 | 4.6 | 4.0 | 3.7 | 5.8 | 7.5 | 3.6 | 6.7 | 4.0 |
| (2g) | H3C—cyclohexyl—C6H4—cyclohexyl—CH2CH2—C6H4—NCS | 5.6 | 5.6 | 4.8 | 4.5 | 5 | 5 | 5 | 5 | 5.5 |

TABLE 1-continued
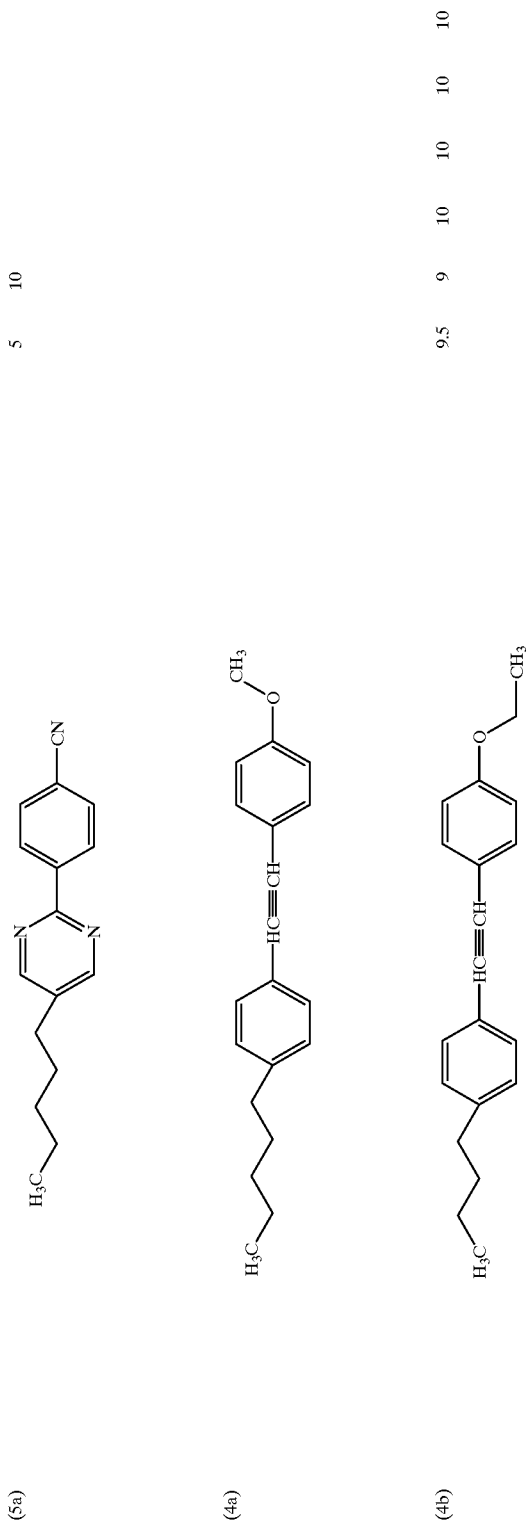
| | | | | | | |
|---|---|---|---|---|---|---|
| (5a) | | 5 | 10 | | | |
| (4a) | | | | | | |
| (4b) | 9.5 | 9 | 10 | 10 | 10 | 10 |

TABLE 2

| Electrooptical Properties Example | $T_{N-1}(°C.)$ | $\Delta n$ | $\Delta \epsilon$ | $V_{10}$ (V) | $V_{90}$ (V) | $N_{90}$ |
|---|---|---|---|---|---|---|
| 1 | 75.0 | 0.1406 | 9.90 | 1.48 | 2.11 | 8.62 |
| 2 | 84.4 | 0.1426 | 10.58 | 1.61 | 2.35 | 7.66 |
| 3 | 74.8 | 0.1388 | 10.42 | 1.48 | 2.15 | 7.67 |
| 4 | 80.0 | 0.1400 | 11.24 | 1.58 | 2.31 | 7.60 |
| 5 | 73.4 | 0.1345 | 11.18 | 1.51 | 2.20 | 7.73 |
| 6 | 68.7 | 0.1345 | 13.51 | 2.23 | 2.33 | 6.89 |
| 7 | 63.3 | 0.1318 | 13.18 | 1.51 | 2.23 | 7.25 |
| 8 | 82.4 | 0.1503 | 14.74 | 1.47 | 2.16 | 7.42 |
| 9 | 79.7 | 0.1471 | 14.98 | 1.61 | 2.39 | 7.08 |
| 10 | 66.0 | 0.1658 | 13.35 | 1.86 | 2.80 | 6.65 |
| 11 | 64.0 | 0.1781 | 20.38 | 1.56 | 2.36 | 6.51 |
| 12 | 94.0 | 0.1511 | 14.28 | 1.48 | 2.12 | 8.41 |
| 13 | 91.6 | 0.1474 | 14.87 | 1.47 | 2.13 | 7.94 |
| 14 | 110.7 | 0.1750 | 20.46 | 1.36 | 1.98 | 7.76 |
| 15 | 76.5 | 0.1453 | 10.97 | 1.51 | 2.15 | 8.68 |
| 16 | 71.1 | 0.1469 | 10.46 | 1.58 | 2.23 | 9.09 |
| 17 | 68.0 | 0.1468 | 10.25 | 1.54 | 2.18 | 8.95 |
| 18 | 77.2 | 0.1454 | 11.01 | 1.56 | 2.21 | 8.91 |
| 19 | 61.2 | 0.1377 | 11.32 | 1.47 | 2.09 | 8.75 |
| 20 | 71.5 | 0.1388 | 11.22 | 1.51 | 2.16 | 8.47 |
| 21 | 73.6 | 0.1419 | 10.92 | 1.59 | 2.27 | 8.56 |
| 22 | 85.0 | 0.1523 | 13.82 | 1.46 | 2.10 | 8.24 |
| 23 | 78.9 | 0.1475 | 13.29 | 1.44 | 2.08 | 8.07 |
| 24 | 79.4 | 0.1742 | 13.85 | 1.50 | 2.19 | 7.65 |
| 25 | 84.1 | 0.1730 | 13.69 | 1.51 | 2.20 | 7.73 |
| 26 | 78.5 | 0.1452 | 11.53 | 1.62 | 2.36 | 7.74 |
| 27 | 76.0 | 0.1390 | 11.29 | 1.48 | 2.13 | 8.21 |
| 28 | 86.2 | 0.1457 | 11.27 | 1.63 | 2.33 | 8.50 |
| 29 | 79.0 | 0.1380 | 12.04 | 1.51 | 2.17 | 8.28 |
| 30 | 90.0 | 0.1507 | 12.91 | 1.52 | 2.16 | 8.77 |
| 31 | 84.0 | 0.1480 | 11.57 | 1.59 | 2.26 | 8.76 |
| 32 | 79.8 | 0.1457 | 11.11 | 1.61 | 2.31 | 8.34 |
| 33 | 80.5 | 0.1460 | 10.57 | 1.65 | 2.39 | 7.95 |
| 34 | 87.5 | 0.1387 | 11.96 | 1.54 | 2.21 | 8.33 |
| 35 | 90.1 | 0.1501 | 14.07 | 1.58 | 2.31 | 7.60 |
| 36 | 76.2 | 0.1351 | 11.56 | 1.48 | 2.13 | 8.21 |
| 37 | 77.5 | 0.1349 | 12.71 | 1.51 | 2.19 | 7.91 |
| 38 | 78.0 | 0.1346 | 12.43 | 1.50 | 2.18 | 7.83 |
| 39 | 71.2 | 0.1543 | 12.66 | 1.51 | 2.18 | 8.09 |
| 40 | 67.3 | 0.1569 | 13.19 | 1.45 | 2.10 | 7.96 |
| 41 | 72.0 | 0.1649 | 12.86 | 1.56 | 2.25 | 8.13 |
| 42 | 71.3 | 0.1713 | 13.96 | 1.48 | 2.15 | 7.84 |
| 43 | 73.5 | 0.1662 | 12.33 | 1.52 | 2.19 | 8.17 |
| 44 | 71.8 | 0.1676 | 13.57 | 1.52 | 2.21 | 7.93 |
| 45 | 73.3 | 0.1513 | 15.10 | 1.40 | 2.05 | 7.55 |

As described above, the liquid crystal composition according to the present invention reveals a nematic phase over a wide range of temperature, including room temperature, and has optical anisotropies and dielectric anisotropies of various magnitudes. Also, a twisted nematic (TN) type liquid crystal display manufactured using the liquid crystal composition can be driven in a multiplexed manner.

What is claimed is:

1. A nematic liquid crystal composition comprising:

a compound represented by a formula (1);

(1)

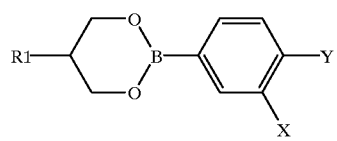

where R1 represents an alkyl group having 1 to 12 carbon atoms, and Y represents a cyano group, a halogen, OR,

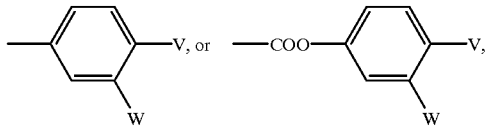

in which X, V and W represent simultaneously or independently hydrogen, a halogen, a cyano group, an alkyl group having 1 to 12 carbon atoms, an alkoxy group having 1 to 12 carbon atoms, or an unsubstituted or substituted aryl group, and R represents an alkyl group having 1 to 12 carbon atoms, a compound represented by a formula (2);

(2)

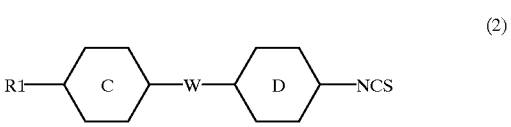

where R1 represents an alkyl group having 1 to 12 carbon atoms, C and D represent simultaneously or independently a phenyl group, a biphenyl group, a cyclohexyl group or a cyclohexylphenyl group, and W represents a single bond or an ethylene group(—CH$_2$CH$_2$—), at least one selected from the group consisting of a compound represented by a formula (3) and a compound represented by a formula (4):

(3)

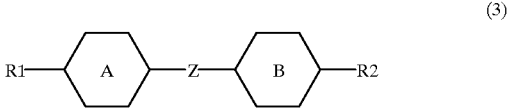

where R1 and R2 represent simultaneously or independently an alkyl group having 1 to 12 carbon atoms or an alkoxy group having 1 to 12 carbon atoms, A and B represent simultaneously or independently a phenyl group, a biphenyl group, a cyclohexyl group or a biphenyl group having a methyl group, and Z represents a single bond or an ester group(—COO—), (4)

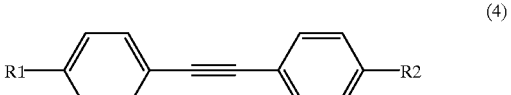

where R1 and R2 represent simultaneously or independently an alkyl group having 1 to 12 carbon atoms or an alkoxy group having 1 to 12 carbon atoms, wherein the contents of the compounds represented by the formulas (1), (2), (3) and (4) are about 1.0 to about 65.0 parts by weight, about 1.0 to about 65.0 parts by weight, about 1.0 to about 50.0 parts by weight and about 1.0 to about 20.0 parts by weight, respectively.

2. The nematic liquid crystal composition according to claim 1, further comprising a compound represented by a formula (5):

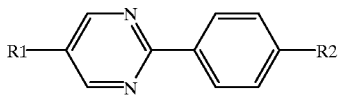

where R1 and R2 represent simultaneously or independently an alkyl group having 1 to 12 carbon atoms, an alkoxy group having 1 to 12 carbon atoms, or a cyano group.

3. The nematic liquid crystal composition according to claim 2, wherein the content of the compound represented by the formula (5) is from about 1.0 to about 20.0 parts by weight.

4. A liquid crystal display having a nematic liquid crystal composition comprising a compound represented by a formula (1), a compound represented by a formula (2), at least one selected from the group consisting of a compound represented by a formula (3) and a compound represented by a formula (4) interposed between a pair of electrode substrates:

(1)

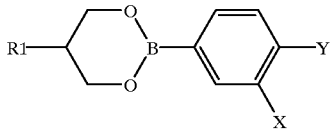

where R1 represents an alkyl group having 1 to 12 carbon atoms, and Y represents a cyano group, a halogen, OR,

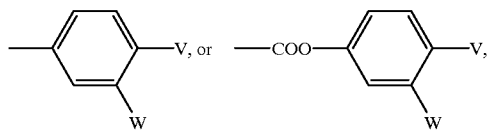

in which X, V and W represent simultaneously or independently hydrogen, a halogen, a cyano group, an alkyl group having 1 to 12 carbon atoms, an alkoxy group having 1 to 12 carbon atoms, or an unsubstituted or substituted aryl group, and R represents an alkyl group having 1 to 12 carbon atoms, (2)

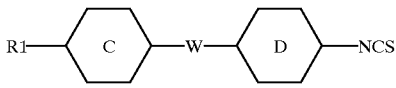

where R1 represents an alkyl group having 1 to 12 carbon atoms, C and D represent simultaneously or independently a phenyl group, a biphenyl group, a cyclohexyl group or a cyclohexylphenyl group, and W represents a single bond or an ethylene group(—$CH_2CH_2$—), (3)

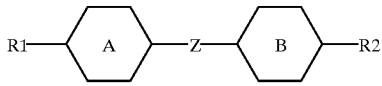

where R1 and R2 represent simultaneously or independently an alkyl group having 1 to 12 carbon atoms or an alkoxy group having 1 to 12 carbon atoms, A and B represent simultaneously or independently a phenyl group, a biphenyl group, a cyclohexyl group or a biphenyl group having a methyl group, and Z represents a single bond or an ester group(—COO—), (4)

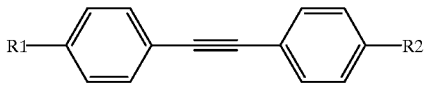

where R1 and R2 represent simultaneously or independently an alkyl group having 1 to 12 carbon atoms or an alkoxy group having 1 to 12 carbon atoms, wherein the contents of the compounds represented by the formulas (1), (2), (3) and (4) are about 1.0 to about 65.0 parts by weight, about 1.0 to about 65.0 parts by weight, about 1.0 to about 50.0 parts by weight and about 1.0 to about 20.0 parts by weight, respectively.

5. The liquid crystal display according to claim 4, wherein the liquid crystal composition further comprises a compound represented by a formula (5):

(5)

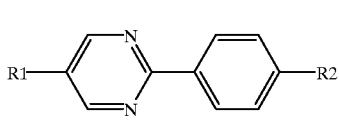

where R1 and R2 represent simultaneously or independently an alkyl group having 1 to 12 carbon atoms, an alkoxy group having 1 to 12 carbon atoms, or a cyano group.

6. The liquid crystal display according to claim 5, wherein the content of the compound represented by the formula (5) is from about 1.0 to about 20.0 parts by weight.

* * * * *